(12) United States Patent
Chen et al.

(10) Patent No.: US 7,362,474 B2
(45) Date of Patent: Apr. 22, 2008

(54) PRINTING QUALITY ENHANCEMENT VIA GRAPHIC/TEXT DETECTION METHOD IN COMPRESSION (JPEG) IMAGE

(75) Inventors: Chen-Chung Chen, Yang-Mei Zhen (TW); Cheng-Huei Chiang, Lung-Gang Village (TW)

(73) Assignee: Lite-On Technology Corp., Neihu, Taipei (TW)

( * ) Notice: Subject to any disclaimer, the term of this patent is extended or adjusted under 35 U.S.C. 154(b) by 858 days.

(21) Appl. No.: 10/862,993

(22) Filed: Jun. 7, 2004

(65) Prior Publication Data

US 2005/0271284 A1 Dec. 8, 2005

(51) Int. Cl.
*G06K 15/00* (2006.01)
*G06T 5/00* (2006.01)
*H04N 1/407* (2006.01)
*H04N 1/409* (2006.01)

(52) U.S. Cl. .................. 358/3.27; 382/176; 382/254; 382/233

(58) Field of Classification Search ................ 382/233, 382/254, 250, 232, 275, 100; 358/3.27, 462; 348/700
See application file for complete search history.

(56) References Cited

U.S. PATENT DOCUMENTS

| | | | | |
|---|---|---|---|---|
| 5,375,197 A * | 12/1994 | Kang | ........................ | 358/462 |
| 5,381,241 A * | 1/1995 | Kawanaka et al. | ......... | 358/462 |
| 5,703,965 A * | 12/1997 | Fu et al. | ..................... | 382/232 |
| 6,100,941 A * | 8/2000 | Dimitrova et al. | .......... | 348/700 |
| 7,055,037 B2 * | 5/2006 | Hsia et al. | ................... | 382/100 |
| 2002/0164084 A1 * | 11/2002 | Baggs | ........................ | 382/275 |

* cited by examiner

*Primary Examiner*—Hai V. Tran
*Assistant Examiner*—Nicholas C Pachol
(74) *Attorney, Agent, or Firm*—Charles E. Baxley

(57) ABSTRACT

The present invention relates to a printing quality enhancement via graphic/text detection method in compression (JPEG) image, wherein an unit of a n×n pixels of plural compressed subimages of a compressed image is taken as a minimum feature extraction unit, and the subimages are taken as input unit, and after a feature attribute and non-feature attribute processing, an output unit is formed and printed.

7 Claims, 9 Drawing Sheets

$$f(j,k) = \begin{bmatrix} 139 & 144 & 149 & 153 & 155 & 155 & 155 & 155 \\ 144 & 151 & 153 & 156 & 159 & 156 & 156 & 156 \\ 150 & 155 & 160 & 163 & 158 & 156 & 156 & 156 \\ 159 & 161 & 162 & 160 & 160 & 159 & 159 & 159 \\ 159 & 160 & 161 & 162 & 162 & 155 & 155 & 155 \\ 161 & 161 & 161 & 161 & 160 & 157 & 157 & 157 \\ 162 & 162 & 161 & 163 & 162 & 157 & 157 & 157 \\ 162 & 162 & 161 & 161 & 163 & 158 & 158 & 158 \end{bmatrix}$$

↓ DCT $$F(u,v) = \begin{bmatrix} 1260 & -1 & -12 & -5 & 2 & -2 & -3 & 1 \\ -23 & -17 & -6 & -3 & -3 & 0 & 0 & -1 \\ -11 & -9 & -2 & 2 & 0 & -1 & -1 & 0 \\ -7 & -2 & 0 & 1 & 1 & 0 & 0 & 0 \\ -1 & -1 & 1 & 2 & 0 & -1 & 1 & 1 \\ 2 & 0 & 2 & 0 & -1 & 1 & 1 & -1 \\ -1 & 0 & 0 & -1 & 0 & 2 & 1 & -1 \\ -3 & 2 & -4 & -2 & 2 & 1 & -1 & 0 \end{bmatrix}$$

PRINTING QUALITY ENHANCEMENT VIA GRAPHIC/TEXT DETECTION METHOD IN COMPRESSION (JPEG) IMAGE

BACKGROUND OF THE INVENTION

1. Field of the Invention

The present invention relates to a printing quality enhancement via graphic/text detection method in compression (Joint Photographic Experts Group, JPEG) image, which is used on the equipment with output function, such as printers or multi-functional peripherals, and before printing, the energy parameters of the compressed image in the DCT (Discrete Cosine Transform) frequency domain are analyzed during the decompression process; moreover, with the help of a halftoning printing mode of automatic feedback-and-correction output equipment, the smoothness and sharpness of the output result can be improved.

2. Description of the Prior Arts

Graphic/text image normally consists of plural pixels, each of which includes three primary colors, red, green and blue. Each primary color is represented by a byte. In this case, a colorful picture of 512×512 pixels needs a memory space of 512×512×3 bytes=786K bytes. Obviously, the memory space is too large. To reduce the memory space of an image, conventional solution is to store the image in a compression format (JPEG). However, the detail features of the compressed image will be reduced according to the compression ratio, and as a result, the output image will be blurred.

Conventional solution for the image feature reduction is to divide the image into plural subimages by taking advantage of the similarity and continuity of the pixels, and then to determine by analyzing the features of the respective subimages the image block either text (feature attribute) or graphic (non-feature attribute). The related technologies are disclosed in U.S. Pat. No. 5,375,197 and U.S. Pat. No. 5,381,241.

In addition, TW Patent 426,834 discloses a printing quality enhancement method that is used to redistribute the edge pixels of the grayscale difference for images based on the theory of interpolation and Error Diffusion, for instance, to improve sharpness and smoothness of the edge of an image by imitating the edge distribution of 600DPI (Dots Per Inch) with an edge feature of 300DPI. The related technologies are also disclosed in U.S. Pat. No. 6,185,329 and U.S. Pat. No. 6,100,941.

According to the above-mentioned prior arts, when the image is transmitted to the output equipment (printer), it will help to improve image smoothness and sharpness, and the printing quality can be enhanced if the detail features of the image can be separately processed. Thus, the present invention provides a printing quality enhancement via graphic/text detection method in compression (JPEG) image.

The present invention has arisen to mitigate and/or obviate the afore-described disadvantages of the conventional technology.

SUMMARY OF THE INVENTION

The primary object of the present invention is to provide a printing quality enhancement via graphic/text detection method in compression (JPEG) image, and before printing, the energy parameters of the compressed image in the DCT frequency domain are analyzed during decompression process; moreover, with the help of a halftoning printing mode of automatic feedback-and-correction output equipment, the smoothness and sharpness of the output result can be improved.

The printing quality enhancement via graphic/text detection method in compression (JPEG) image includes the following steps:

Step 1: subimage decompression serving to transform the compressed subimages from frequency domain into space domain;

Step 2: GTD (graphic/text detection) analysis serving to determine attribute of the subimages by calculating detail features of the subimages based on the frequency parameter of DCT of the subimages;

Step 3: weight adjustment serving to process the respective subimages that have been processed by the GTD analysis in a manner that respectively processes, based on different weight processing, the subimages having feature attribute and the subimages having non-feature attribute, and then result of the weight processing is used to determine edge direction of the respective subimages;

Step 4: output processing serving to smoothly distribute ink dots of the respective subimages of non-edge feature and to sharply distribute ink dots of the subimages of edge feature with halftoning error diffusion.

Moreover, the above-mentioned weights, including a detail feature weighted and a directional weight, operate with a quantizer and an error filter respectively, and then adopt automatic feedback-and-correction function to correct the halftoning mode of the printer to enhance the printing quality.

The present invention will become more obvious from the following description when taken in connection with the accompanying drawings, which show, for purpose of illustrations only, the preferred embodiments in accordance with the present invention.

BRIEF DESCRIPTION OF THE DRAWINGS

FIG. 3 shows the reference results of DCT in accordance with the present invention;

DETAILED DESCRIPTION OF THE PREFERRED EMBODIMENTS

Figure 1:
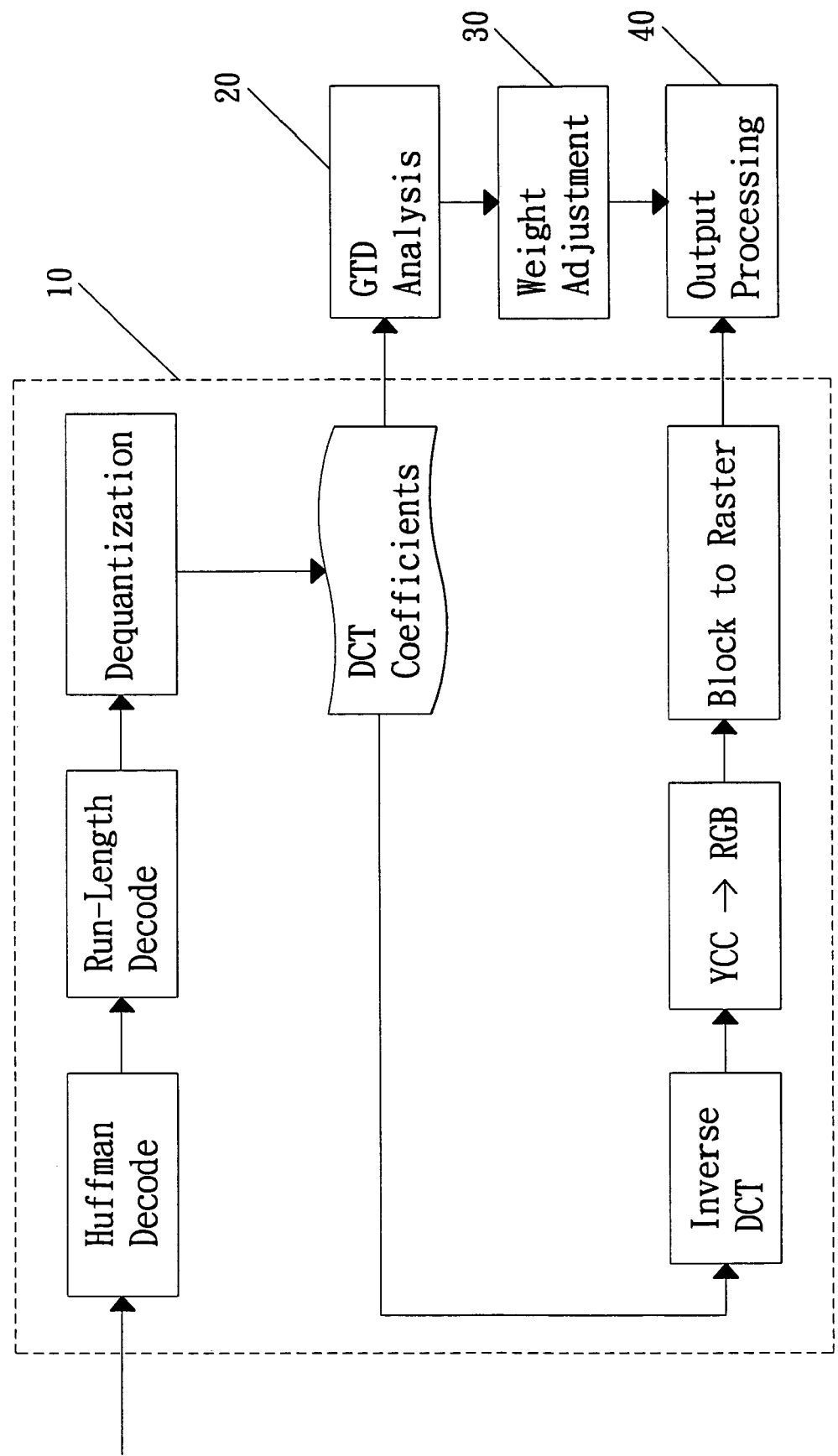
FIG. 1 is a block diagram for illustrating a printing quality enhancement via graphic/text detection method in accordance with the present invention.
Figure 2:
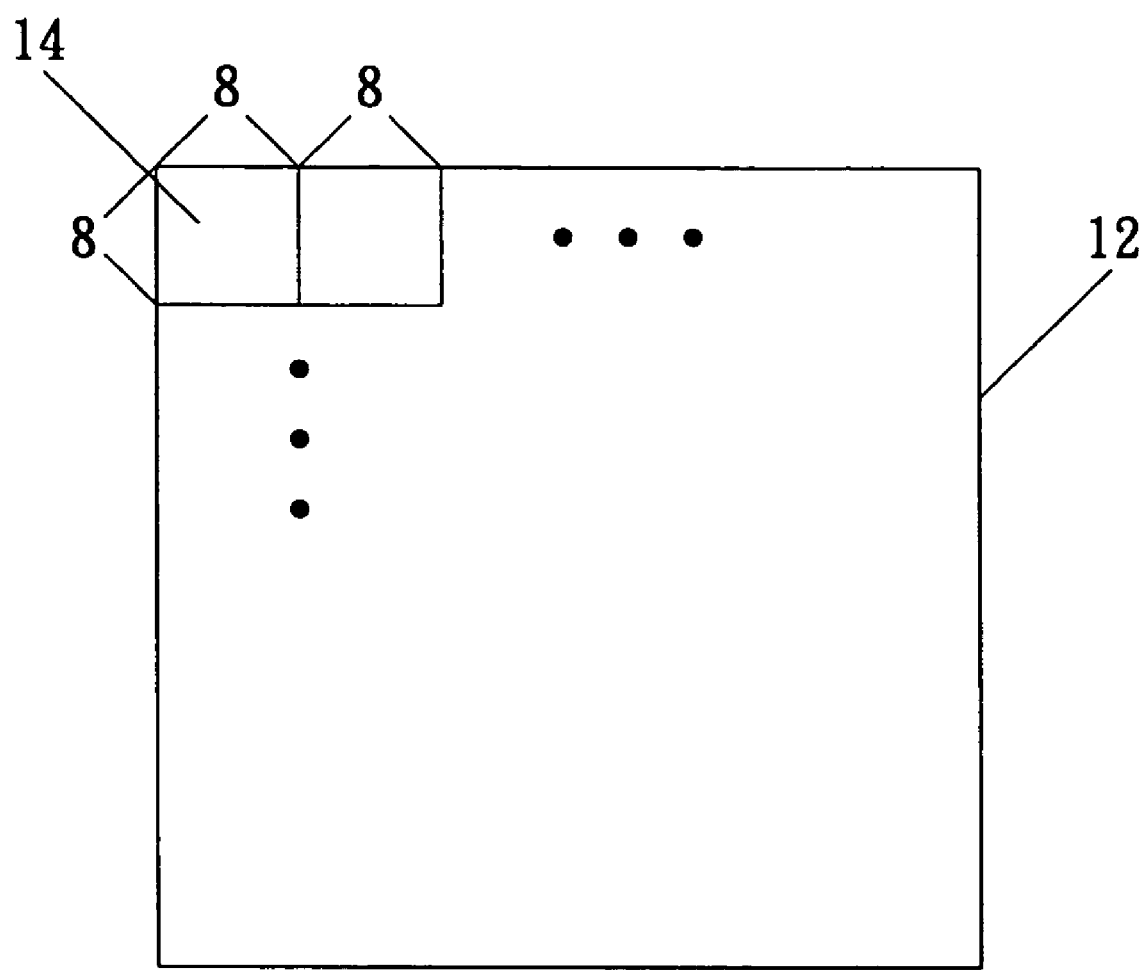
FIG. 2 is an illustrative view of a compressed image in accordance with the present invention.

Referring to FIG. 1, a graphic/text detection method in accordance with the present invention is shown and generally includes subimage decompression 10, a graphic/text detection (GTD) analysis 20, a weight adjustment 30 and an output processing 40. FIG. 2 shows a compressed image 12 which is partitioned into plural image blocks of 8×8 pixels, and each of the plural image blocks is defined as a subimage 14. All of the subimages 14 in the compressed image 12 are matrix-distributed, and the subimages are represented by $X_{ij}$, while the subimages in FIG. 2 are represented by $X_{11}$.

The subimage decompression 10 refers to a reverse procedure of JPEG compression that is used to achieve decompression effect, and the decompression program includes: Huffman decode, a Run-Length Decode, a Dequantization, a Inverse DCT, YCC-to-RGB and Block-to-Raster. Since the decompression method belongs to conventional knowledge, any further remarks would be superfluous. It is to be noted that the decompression program further includes a procedure of "reading the parameter of DCT," which is taken place between the Dequantization and the Inverse DCT.

Referring to FIG. 3, as concerned, the input of the DCT is to define the white dots as 255 and to define the black dots as 0, in which the f(j,k) refers to the input of a subimage, and after the calculation of the formula of DCT, the F(u,v) is used to represent 8×8 parameters of the corresponding output. Through this way, the image can be transformed from space domain into frequency domain via the DCT, and the greatest parameter at the top left corner is the high frequency parameter.

Figure 4:
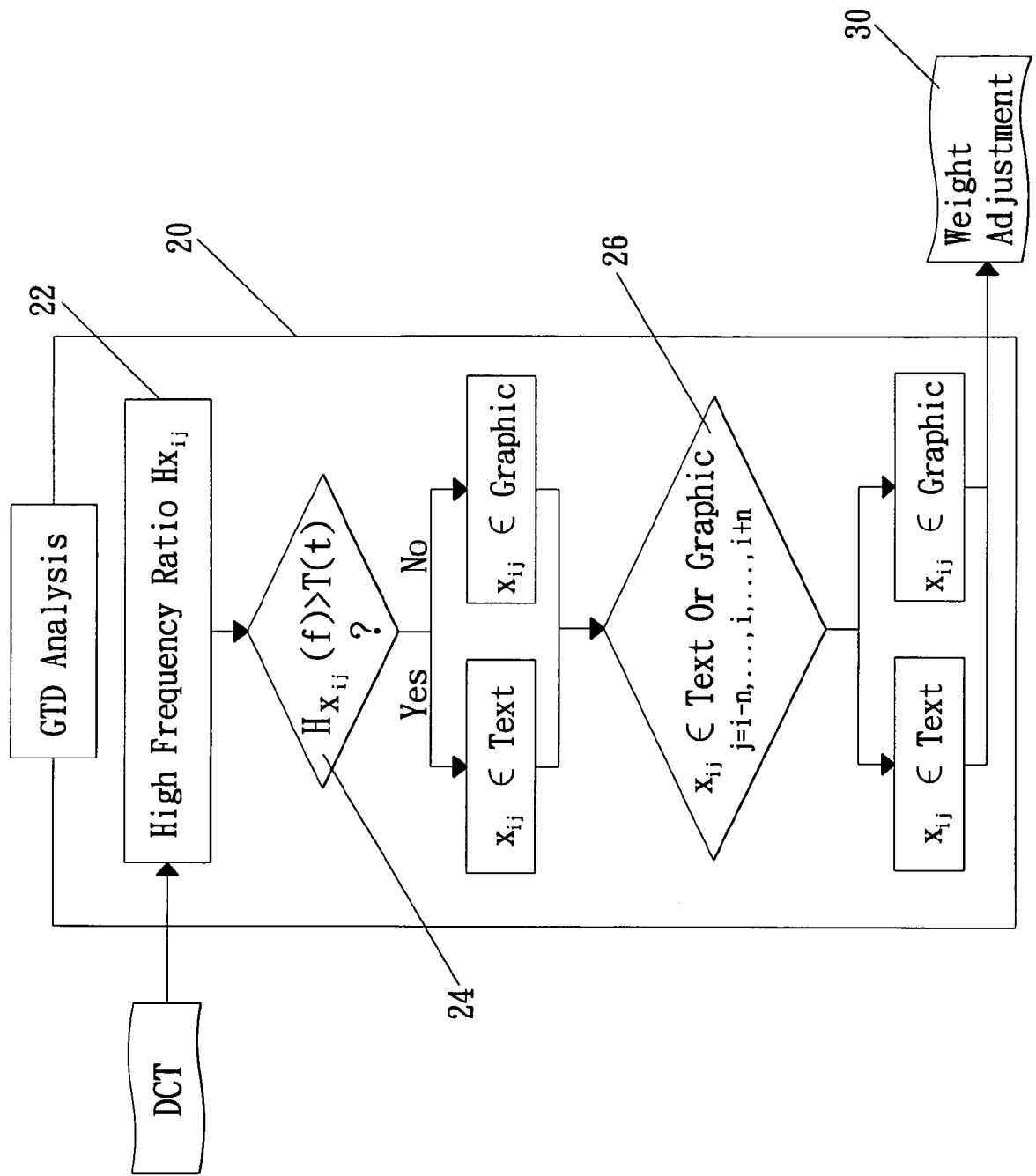
FIG. 4 is a block diagram for showing the GTD analysis in accordance with the present invention.

Referring to FIG. 4, the GTD analysis 20 serves to calculate the is high frequency ratio 22 based on the parameter of the DCT of the respective subimages ($X_{ij}$). Here, the method for calculating the high frequency ratio 22 is explained as follows:

$$Hx_{ij}(f) = \frac{\left[\sum_{p=0}^{7}\sum_{q=0}^{7}|fx_{ij}(p,q)| - fx_{ij}(0,0)\right]}{\sum_{p=0}^{7}\sum_{q=0}^{7}|fx_{ij}(p,q)|}$$

Figure 5:
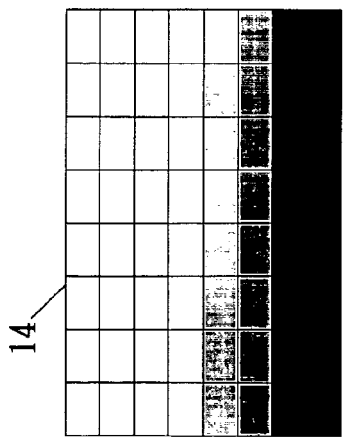
FIG. 5 shows the subimages with horizontal feature and the corresponding results of DCT parameter.
Figure 6:
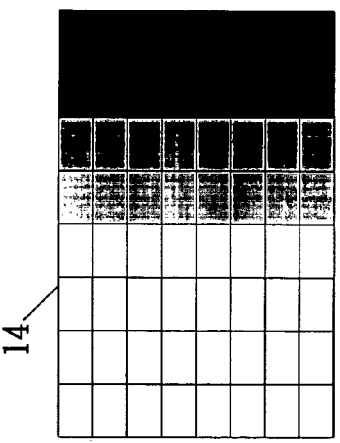
FIG. 6 shows the subimages with vertical feature and the corresponding results of DCT parameter.

Referring to FIG. 5, takes the subimage 14 of 8×8 pixels for example and under the condition of 256 colors, the subimage 14 has level-of-detail feature, the white portion is represented by 255, the black portion is represented by 0, and the gray portion in the middle is varied from 0-255 according to the darkness of the color. When the subimage 14 gains 8×8 parameters via the formula of DCT, the corresponding high frequency ratio can be calculated as: $Hx_{ij}(f) = 0.607$. With reference to FIG. 6, another subimage 14 having level-of-detail feature can obtain 8×8 parameters via the formula of DCT, and then the high frequency ratio can be calculated as: $Hx_{ij}(f) = 0.607$.

As shown in FIG. 4, after achieving the high frequency ratio $Hx_{ij}(f)$ of the subimage, the $Hx_{ij}(f)$ can be compared with a preset reference value T(t) via a comparative program 24. It is supposed that T(t)=0.1, with reference to FIGS. 5 and 6, under the condition of $Hx_{ij}(f) > T(t)$, the input subimage can be determined as text because texts are usually black and surrounded by blanks. The pixel distribution is similar to the condition as shown in FIGS. 5 and 6.

In this case, when the high frequency ratio is greater than the preset value, the subimage can be determined as a text image having edge feature. On the contrary, the subimage will (can) be determined as the graphic image without edge feature when the high frequency ratio is less than the preset value.

Figure 7:
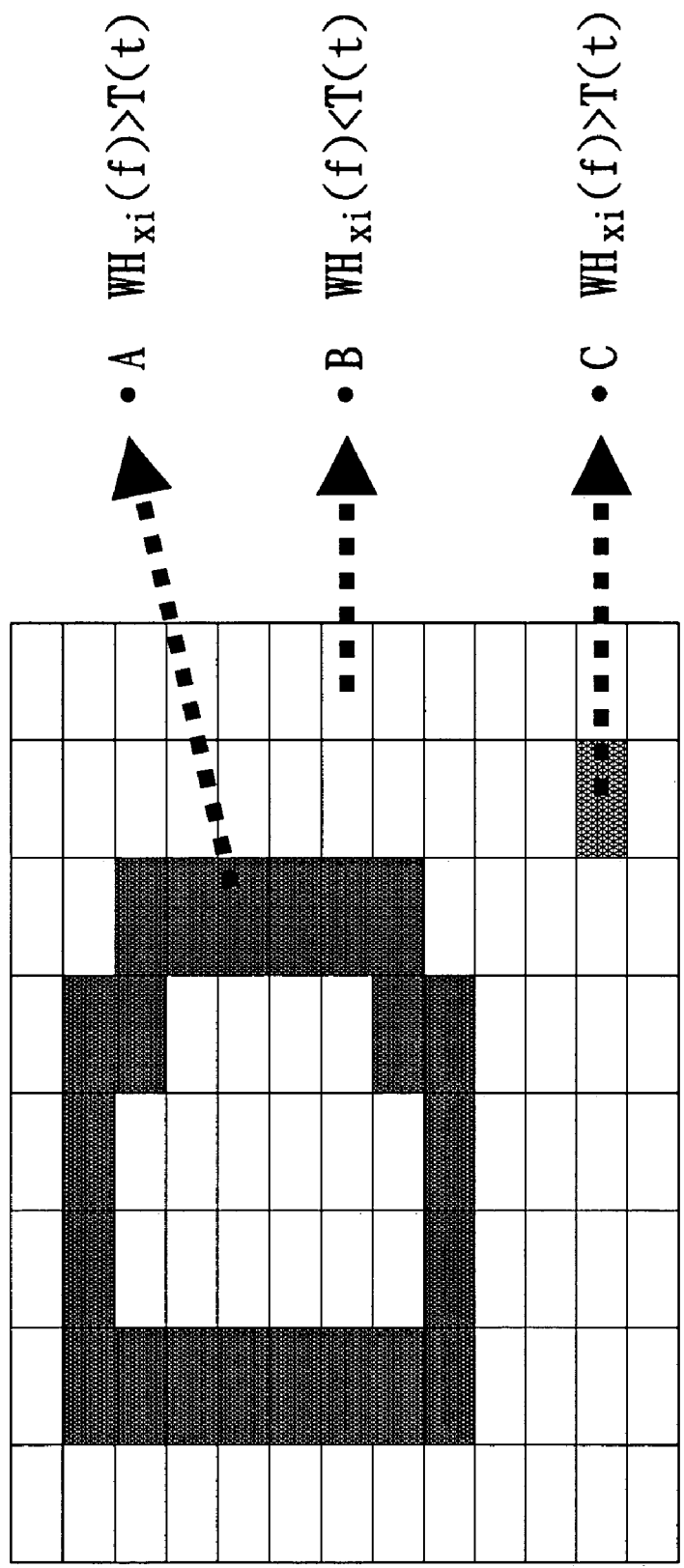
FIG. 7 shows the process for determining the feature attribute of neighboring tiles in accordance with the present invention.

To improve the correctness of the subimage attribute, a program for determining the feature of neighboring tiles 26 can be used in the present invention. As shown in FIG. 7, the $Hx_{ij}(f)$ of tile A>T(t), thereby tile A is determined as text feature, and the neighboring tile has edge feature. In this case, it can improve the correctness of text feature of the tile A. Tile B is initially determined as $Hx_{ij}(f) < T(t)$, thus it belongs to non-text feature attribute, furthermore, the neighboring tile also is non-text feature attribute. In this case, the correctness of the non-edge feature of the tile B is high. Tile C is initially determined as edge feature because the initial determination is $Hx_{ij}(f) > T(t)$, however, the neighboring tiles have no edge feature, therefore, the tile C is not the subimage with edge feature.

Figure 8:
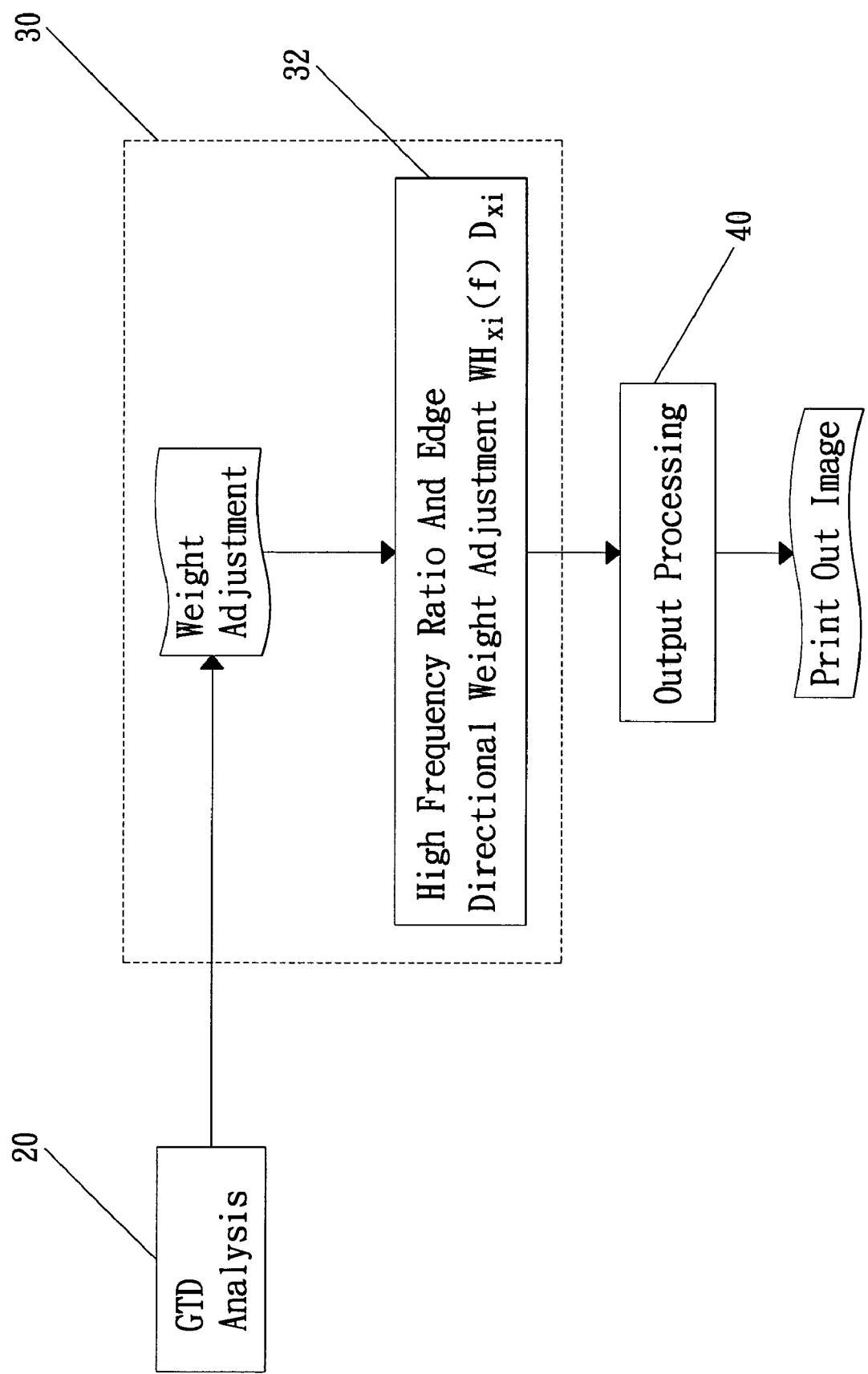
FIG. 8 is a block diagram for showing the weight adjustment and output processing in accordance with the present invention.

Referring to FIG. 8, when the above-mentioned GTD analysis 20 is finished, a weight adjustment 30 can be used to further enhance the printing quality, which includes a high frequency ratio and edge directional weight adjustment 32. The calculation method for the weight of high frequency ratio is as follows:

$$WHx_{ij}(f) = \frac{\left[\sum_{p=0}^{7}\sum_{q=0}^{7}|fx_{ij}(p,q)| - fx_{ij}(0,0)\right]}{\sum_{p=0}^{7}\sum_{q=0}^{7}|fx_{ij}(p,q)|} \times Wi$$

where the $WHx_{ji}$ refers to the weight value of the high frequency ratio, while the Wi refers to a self-determined weight adjustment parameter. It is supposed that Wi=1.0, when Wi>1, the $WHx_{ji}$ is increased, and thereby it has a high frequency ratio enlarging function.

The calculation for directional weight $DX_{ij}$ is shown as follows:

$Dx_{ij}$: If $vx_{ij}(f) > hx_{ij}$ then $Dx_{ij} = vx_{ij}(f) \times Wi$ else $Dx_{ij} = hx_{ij}(f) \times Wi$ where $$vx_{ij}(f) = \max\left\{\frac{\sum_{p=1}^{7}|fx_{ij}(p,q)|}{\sum_{p=0}^{7}\sum_{q=0}^{7}|fx_{ij}(p,q)|} \middle| q=0,2,3,\ldots,7\right\} - \min\left\{\frac{\sum_{p=1}^{7}|fx_{ij}(p,q)|}{\sum_{p=0}^{7}\sum_{q=0}^{7}|fx_{ij}(p,q)|} \middle| q=0,2,3,\ldots,7\right\}$$

-continued $$hx_{ij}(f) = \max\left\{\frac{\sum_{q=1}^{7}|fx_{ij}(p,q)|}{\sum_{p=0}^{7}\sum_{q=0}^{7}|fx_{ij}(p,q)|} \middle| p=0,2,3,\ldots,7\right\} -$$

$$\min\left\{\frac{\sum_{q=1}^{7}|fx_{ij}(p,q)|}{\sum_{p=0}^{7}\sum_{q=0}^{7}|fx_{ij}(p,q)|} \middle| p=0,2,3,\ldots,7\right\}$$

the above-mentioned $VX_{ij}$ refers to the edge feature of the subimage in the vertical direction, while the $hX_{ij}$ refers to the edge feature of the subimage in the horizontal direction. With the weight adjustment, the printing enhancement both in vertical direction and horizontal direction can be achieved.

Figure 9:
FIG. 9 is comparative view of showing the output results in accordance with the present invention and the conventional output result.
Figure 9:
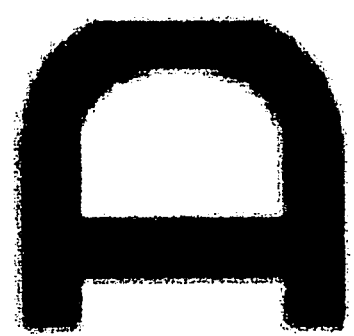
Figure 9:
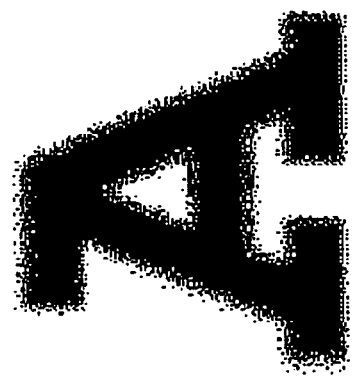
Figure 9:
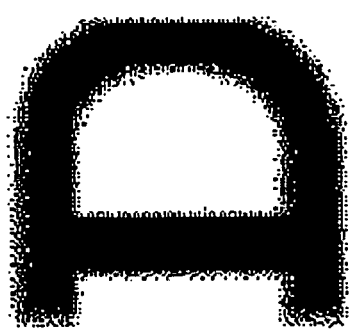
Figure 9:
Figure 9:
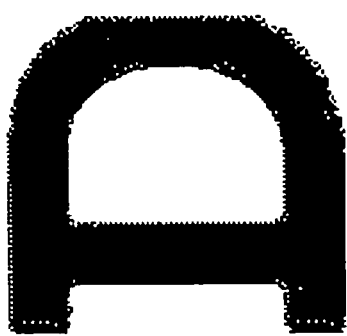

With reference to FIG. 8, after being processed in the weight adjustment, the subimages will be processed in an output processing 40. Since the weight-adjusted subimages have an effect of feature separation (graphic/text detection), by cooperating with appropriate halftoning mode, such as error diffusion, partial print feature of the output file will be enhanced based on the results of weight adjustment. As shown in FIG. 9, part A is the initial con-tone printing, part B is the printing based on the halftoning mode whose edge feature is sharper than that of the part A, and part C is the printing based on the feature separation method in accordance with the present invention via halftoning processing, it can be clearly seen that the edge of part C has been substantially sharpened.

Figure 10:
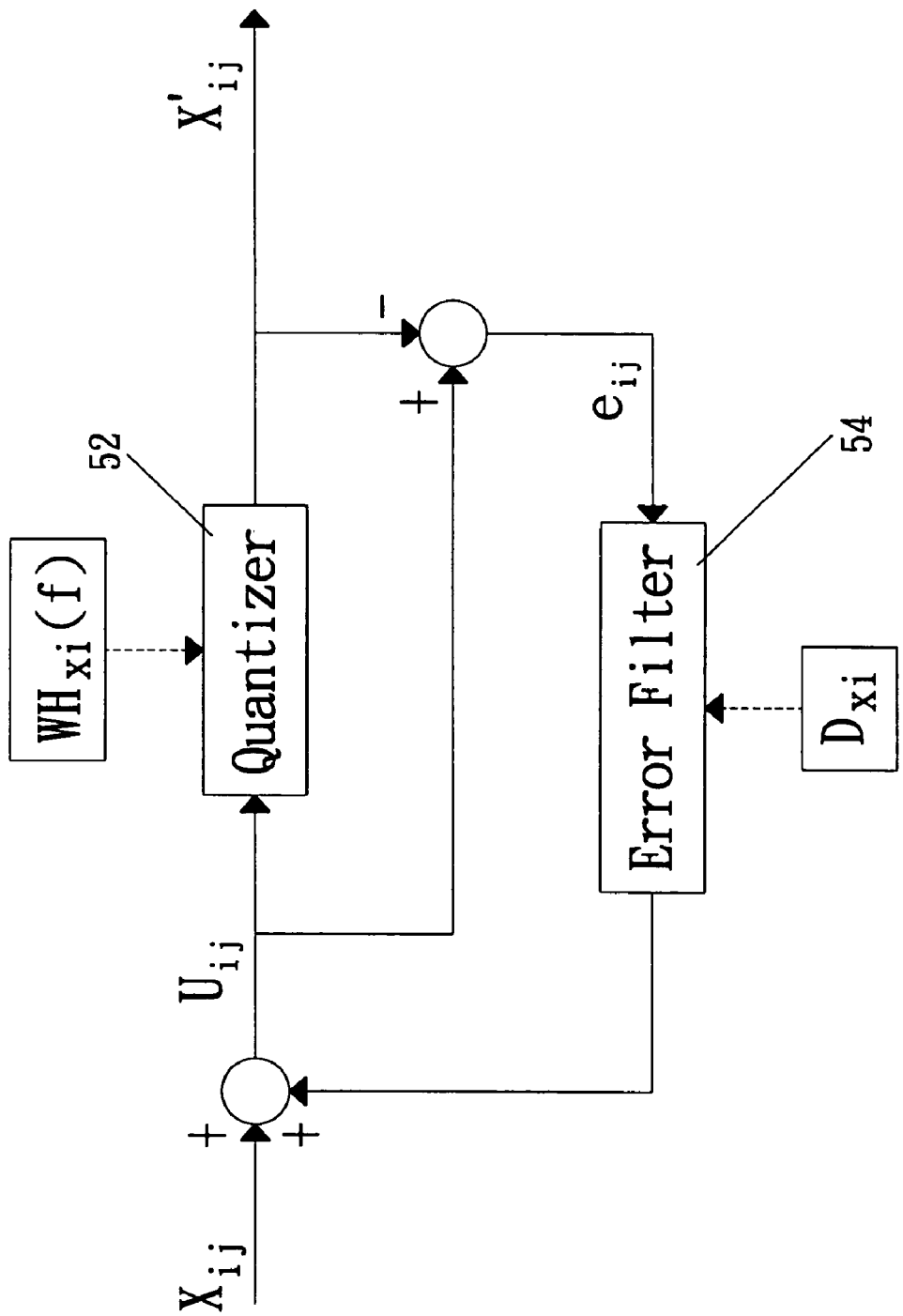
FIG. 10 is a block diagram in accordance with the present invention showing the real operation.

Referring to FIG. 10, in real operation, a quantizer 52 and an error filter 54 can be disposed between the input pixels $X_{ij}$ and the output pixels $X'_{ij}$, and a closed-loop system is formed between the input pixels $X_{ij}$ and the output pixels $X'_{ij}$. The weight of the high frequency ratio $WHx_{ji}$ is added to the quantizer 52 and the directional weight $DX_{ij}$ is added to the error filter 54. The $U_{ij}$ is error accumulation, and the $e_{ij}$ is the error between the output pixels and the error accumulation. By such arrangements, printing quality enhancement can be achieved based on halftoning mode of the automatic feedback-and-correction printer.

Hence, as mentioned above, the printing quality enhancement method in accordance with the present invention has the following advantages:

1) The method of text/graphic detection can enable the to-be-printed text/graphic to have a good printing quality.
2) Most of the compressed images are processed according to a compression unit of 8×8, so it conforms to the appropriate pixel processing unit of the feature domain processing.
3) In each of the subimages of 8×8 pixels, most image detail features are concentrated in the high frequency coefficient energy of DCT, and the feature content ratio of the subimage can be obtained via the parameter analysis, so as to form the basis of the text/graphic detection.
4) No complex calculation is required, and printing quality enhancement can be achieved via the cooperation of error diffusion with the quantizer and the related error filter in printing mode selections.
5) Separating the subimage region having edge feature from the subimage region having non-edge feature in consideration of the edge feature value, the grayscale value and the error accumulation, such that the ink dots of subimages having edge feature and the ink dots of subimages having non-edge feature can be continuously (sharply) and discretely (smoothly) distributed.
6) No need to process the image feature extraction on the basis of complete image, and the image feature extraction can be processed anytime during the image decompression.

While we have shown and described various embodiments in accordance with the present invention, it should be clear to those skilled in the art that further embodiments may be made without departing from the scope of the present invention.

What is claimed is:

1. A printing quality enhancement via graphic/text detection method in compression (JPEG) image, wherein an unit of n×n pixels of plural compressed subimages of a compressed image is taken as a minimum feature extraction unit, and the subimages are taken as input unit, then an output unit is formed via a feature attribute and non-feature attribute processing, and finally the output unit is printed, such a method includes the following steps:

subimage decompression serving to transform the compressed subimage pixels from frequency domain into space domain, including a DCT;

GTD analysis serving to determine the attribute of the subimages by calculating detail features of the subimages based on the frequency parameter of DCT of the subimages;

weight adjustment serving to process the respective subimages that have been processed by the GTD analysis in a manner that respectively processes, based on different weight processing, the subimages having feature attribute and the subimages having non-feature attribute, and result of the weight processing is used to determine edge direction of the respective subimages;

output processing serving to smoothly distribute ink dots of the respective subimages of non-edge feature and to sharply distribute ink dots of the subimages of edge feature with halftoning error diffusion.

2. The printing quality enhancement via graphic/text detection method in compression (JPEG) image as claimed in claim 1, wherein the GTD analysis includes a comparative program which serves to compare the high frequency ratio H(f) of the respective subimages with a preset reference value T(t), the subimages have text (edge) feature if $Hx_{ij}(f) > T(t)$, and the subimages have graphic (non-edge) feature if $Hx_{ij}(f) < T(t)$, a method for calculating the high frequency ratio is explained as follows:

$$Hx_{ij}(f) = \frac{\left[\sum_{p=0}^{7}\sum_{q=0}^{7}|fx_{ij}(p,q)| - fx_{ij}(0,0)\right]}{\sum_{p=0}^{7}\sum_{q=0}^{7}|fx_{ij}(p,q)|}$$

where the T(t) is a preset critical value.

3. The printing quality enhancement via graphic/text detection method in compression (JPEG) image as claimed in claim 1, wherein the weight adjustment includes a detail feature weight $WHx_{ij}(f)$, a calculation method for $WHx_{ij}(f)$ is as follows:

$$WHx_{ij}(f) = \frac{\left[\sum_{p=0}^{7}\sum_{q=0}^{7}|fx_{ij}(p,q)| - fx_{ij}(0,0)\right]}{\sum_{p=0}^{7}\sum_{q=0}^{7}|fx_{ij}(p,q)|} \times Wi$$

where the Wi is a preset reference value.

4. The printing quality enhancement via graphic/text detection method in compression (JPEG) image as claimed in claim 1, wherein the weight adjustment further includes a directional weight $DX_{ij}$, and a calculation for the directional weight $DX_{ij}$ is shown as follows:

$Dx_{ij}$: If $vx_{ij}(f) > hx_{ij}$ then $Dx_{ij} = vx_{ij}(f) \times Wi$ else $Dx_{ij} = hx_{ij}(f) \times Wi$ where $$vx_{ij}(f) = \max\left\{\left|\frac{\sum_{p=1}^{7}|fx_{ij}(p,q)|}{\sum_{p=0}^{7}\sum_{q=0}^{7}|fx_{ij}(p,q)|}\right| q = 0,2,3,\ldots,7\right\} -$$

$$\min\left\{\left|\frac{\sum_{p=1}^{7}|fx_{ij}(p,q)|}{\sum_{p=0}^{7}\sum_{q=0}^{7}|fx_{ij}(p,q)|}\right| q = 0,2,3,\ldots,7\right\}$$

-continued $$hx_{ij}(f) = \max\left\{\left|\frac{\sum_{q=1}^{7}|fx_{ij}(p,q)|}{\sum_{p=0}^{7}\sum_{q=0}^{7}|fx_{ij}(p,q)|}\right| p = 0,2,3,\ldots,7\right\} -$$

$$\min\left\{\left|\frac{\sum_{q=1}^{7}|fx_{ij}(p,q)|}{\sum_{p=0}^{7}\sum_{q=0}^{7}|fx_{ij}(p,q)|}\right| p = 0,2,3,\ldots,7\right\}$$

the Wi is a preset reference value.

5. The printing quality enhancement via graphic/text detection method in compression (JPEG) image as claimed in claim 1, wherein the GTD analysis further includes a process for determination of feature of neighboring tiles, so as to improve correctness of the attribute of the respective subimages.

6. The printing quality enhancement via graphic/text detection method in compression (JPEG) image as claimed in claim 1, wherein a quantizer and an error filter are disposed between the input unit and the output unit and form a closed-loop auto-control system; further, the weight adjustment further includes a detail feature weight and a directional weight, the detail feature weight is added to the quantizer and the directional weight is added to the error filter.

7. The printing quality enhancement via graphic/text detection method in compression (JPEG) image as claimed in claim 1, wherein the n×n pixels of the respective subimages refer to n=8.

\* \* \* \* \*